United States Patent [19]

Brown, Jr.

[11] 4,421,342

[45] Dec. 20, 1983

[54] ROTARY ACTUATION DEVICE

[76] Inventor: Milton F. Brown, Jr., 2035 Echo Cove, Virginia Beach, Va. 23454

[21] Appl. No.: 285,814

[22] Filed: Jul. 22, 1981

Related U.S. Application Data

[63] Continuation of Ser. No. 12,569, Feb. 15, 1979, abandoned.

[51] Int. Cl.$^3$ .............................................. B60R 21/06
[52] U.S. Cl. ..................... 280/740; 49/110; 49/141; 49/340; 280/741; 280/753
[58] Field of Search ............. 280/737, 736, 730, 806, 280/740, 741, 753; 74/99 R, 89.15, 99 A, 89; 292/DIG. 65, 144, 142, 172; 49/141, 340, 104, 109–113; 222/5

[56] References Cited

U.S. PATENT DOCUMENTS

| | | | |
|---|---|---|---|
| 2,806,737 | 9/1957 | Maxwell | 280/734 X |
| 2,989,198 | 6/1961 | Bradley | 74/99 A X |
| 3,391,722 | 7/1968 | Ligh | 74/89 X |
| 3,638,461 | 2/1972 | Watson | 292/142 X |
| 3,791,476 | 2/1974 | Wernig | 280/753 |
| 3,966,226 | 6/1976 | Roth | 280/737 |

*Primary Examiner*—Joseph E. Valenza
*Assistant Examiner*—Donald W. Underwood
*Attorney, Agent, or Firm*—Shlesinger, Arkwright, Garvey & Fado

[57] ABSTRACT

An emergency release and rotary actuator including a cylinder containing compressed gas or ignitable chemical material, a pressure tube and electrically fired detonation means for releasing the gas into such pressure tube or igniting the chemical material to release the gaseous products of combustion there under pressure into such pressure tube, a piston within such pressure tube, the shaft of which extends outside the pressure tube and carries a lug which engages diverging slots in closely surrounding tubes, all except one of which is rotatable, and a shaft, gear, pulley, or arm attached to one or more of the rotatable concentric tubes. An electrical impulse from a sensing or manual switch causes a detonating force releasing gas or igniting the chemical to drive the piston, the shaft lug of which moves through the diverging slots to rotate at least one rotatable concentric tube to operate a latch, tighten a strap or position a panel or air bag. The addition of an outer tube or container around the pressure tube to conduct gas from apertures in the pressure tube to inflatable and extendable tubes or containers after completion of piston travel permits a sequential function of inflating and extending such tubes or containers after rotation.

16 Claims, 17 Drawing Figures

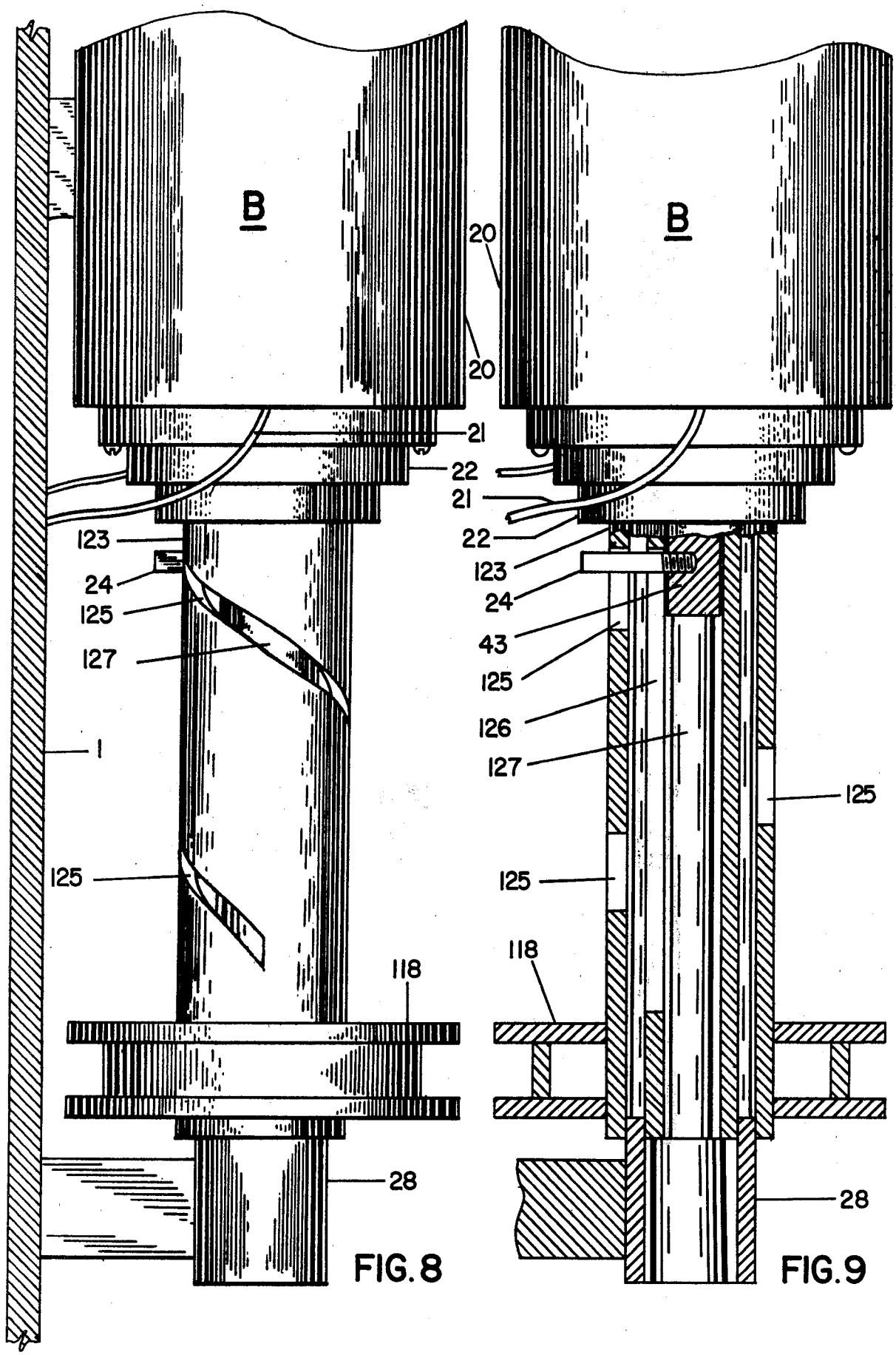

ROTARY ACTUATION DEVICE

This is a continuation of application Ser. No. 012,569, filed Feb. 15, 1979, now abandoned.

BACKGROUND OF THE INVENTION

This invention relates to a self-contained, electrically fired rotary actuator for use in vehicles and in other applications where a high speed and powered rotational force moving through a predetermined angle is required to operate a latch or position a protective restraint or exit panel for safety of persons.

Tests conducted by the Federal Government and by industry have demonstrated that the application of a restraint upon a passenger involved in a vehicle accident must be within a fraction of a second after impact to provide useful protection. In case of accidents involving vehicles carrying a large number of passengers, such as aircraft or buses, emergency exits must be opened within seconds. Maximum public acceptance and use of restraint systems and vehicle emergency devices requires the employment of unobtrusive devices which permit an optimum freedom of movement by passengers in normal vehicle operations, yet instantaneous protection when an accident occurs. A high speed device applying a predetermined amount of linear or rotary force is required in emergencies to open or close latches or turn protective devices, exists and other devices to a desired position. The energy source for these emergency linear or rotary force devices may be centralized or may be unitized with the device itself for reliability or economies in space or weight. Actuation by springs, compressed gases or fluids under high pressure is well known in prior art. Explosive actuators are also well known.

Review of prior art shows wide usage of compressed gas cylinders or cartridges to inflate air bag protective devices in vehicles and the use of electrically fired detonators to rupture the diaphragm sealing the gas cylinder. U.S. Pat. No. 3,567,245 granted to G. A. Ekstrom on Mar. 2, 1971, discloses a diaphragm made of friable material sealing a compressed gas cylinder, such diaphragm being shattered by an explosive charge upon electrical impulse, thereby releasing the gas into an air bag contained within the vehicle dashboard. In U.S. Pat. No. 3,777,772 issued on Dec. 11, 1973, to T. E. Arnold et al, a domed diaphragm having a discontinuous groove and a shaped charge with electrical leads is inserted into the outlet end of a compressed gas cylinder and on detonation the domed diaphragm is severed by the shaped charge along the discontinuous groove, thereby releasing the gas into a manifold and from the manifold to an inflatable cushion.

Movement of a vehicle passenger restraint from a stored position to a desired protective position has been previously achieved by the use of springs, cables, air bag configuration or a combination of these. U.S. Pat. No. 3,664,682 granted to C. E. Wycech on May 23, 1972, shows the rotation of a cushion and separate air bag into position by release of compression springs. U.S. Pat. No. 3,753,576 issued on Aug. 21, 1973 to J. F. Gorman, teaches the positioning of a composite elliptical bag over a passenger by gas and spring ejection followed by inflation of the shaped bag. U.S. Pat. No. 3,774,936 granted to R. R. Barnett et al on Nov. 27, 1973, shows an inflatable cushion guided into position by the use of endless loop cables anchored at one point on each side of the cushion, and U.S. Pat. No. 3,836,168 issued to K. Honaka on Sept. 17, 1974 teaches the drawing of a protective net into position by projecting inflatable tubes or projectiles attached to side cables or cords which are drawn tight by expansion of separate inflatable tubes or projectiles.

It is the primary purpose of this invention to provide a compact high seed rotary actuator which uses the force from high pressure gases released from a cylinder to drive a piston which rotates a shaft with attached gear, pulley, arm or panel, thereby moving a latch, tightening a strap or positioning a protective panel or air bag for greater passenger safety. It is a further purpose to provide such a device capable of sequentially unlatching and turning a shaft with attachments to a desired position. Another objective is to provide such a device which sequentially rotates a shaft with attachments to a desired position and then releases the high pressure gas into a surrounding tube or hollow shaft connected to one or more air bags or telescoping tubes with attached plates or straps. A still further objective is to provide such a device which permits independent positioning of protective restraints or air bag containers during normal operation of a vehicle but moves automatically into desired position for passenger protection in the event of accident.

Other objects and advantages of the invention will be apparent from the following description.

SUMMARY OF THE INVENTION

The present invention provides a release and rotary actuator for the emergency release or engagement of latches and rotation of protective devices, escape exits and other vehicle parts and accessories to a desired position for passenger safety and escape, such device comprising:

a. a cylinder containing gas under pressure or ignitable chemical material capable of instantaneous generation of high pressure gas, such cylinder being fixed into and sealing one end of a pressure tube containing electrically fired detonation means for rupturing the cylinder diaphragm or igniting the chemical material in the cylinder and a piston, such piston being driven outwardly to an annular stop by the force of release or generation of high pressure gas;

b. a piston shaft extending outside the pressure tube and having one or more lugs which engage diverging slots in two or more concentric tubes closely surrounding the shaft, one of which tubes is in a fixed relation to the pressure tube and one or more other concentric tubes capable of rotation or of rotating the concentric tube which is in fixed relation to the pressure tube when the piston shaft lug is driven through the diverging slots;

c. a gear, pulley, shaft or arm attached to one or more of the rotatable concentric tubes, such gear, pulley, shaft or arm being attached to or engaging a latch, rack, strap, panel or pad and moving such latch, rack, panel or pad to a desired position upon rotation of one or more concentric tubes;

d. a sealed tube or container surrounding the pressure tube and into which gases released from apertures in the wall of the pressure tube escape after completion of predetermined piston travel within the pressure tube, such surrounding tube or container being capable of conducting the gases to one or more inflatable containers and of being rotated in conjunction with rotation of the pressure tube, thereby positioning and inflating an air bag or other inflatable container for passenger protection; and, e. a sensing and triggering means furnishing electrical impulse to such detonation means within the pressure tube which ruptures the cylinder diaphragm or ignites chemical material to release or generate gas.

DETAILED DESCRIPTION OF THE DRAWINGS

A description of the invention with reference to the accompanying drawings is as follows:

FIG. 8 is a side elevational view of another embodiment of the device attached to a surface in which the outer concentric tube has a spiral slot and attached pulley and the inner concentric tube has a longitudinal slot;

FIG. 9 is a partial sectional view of the device as shown in FIG. 8;

Figure 11:
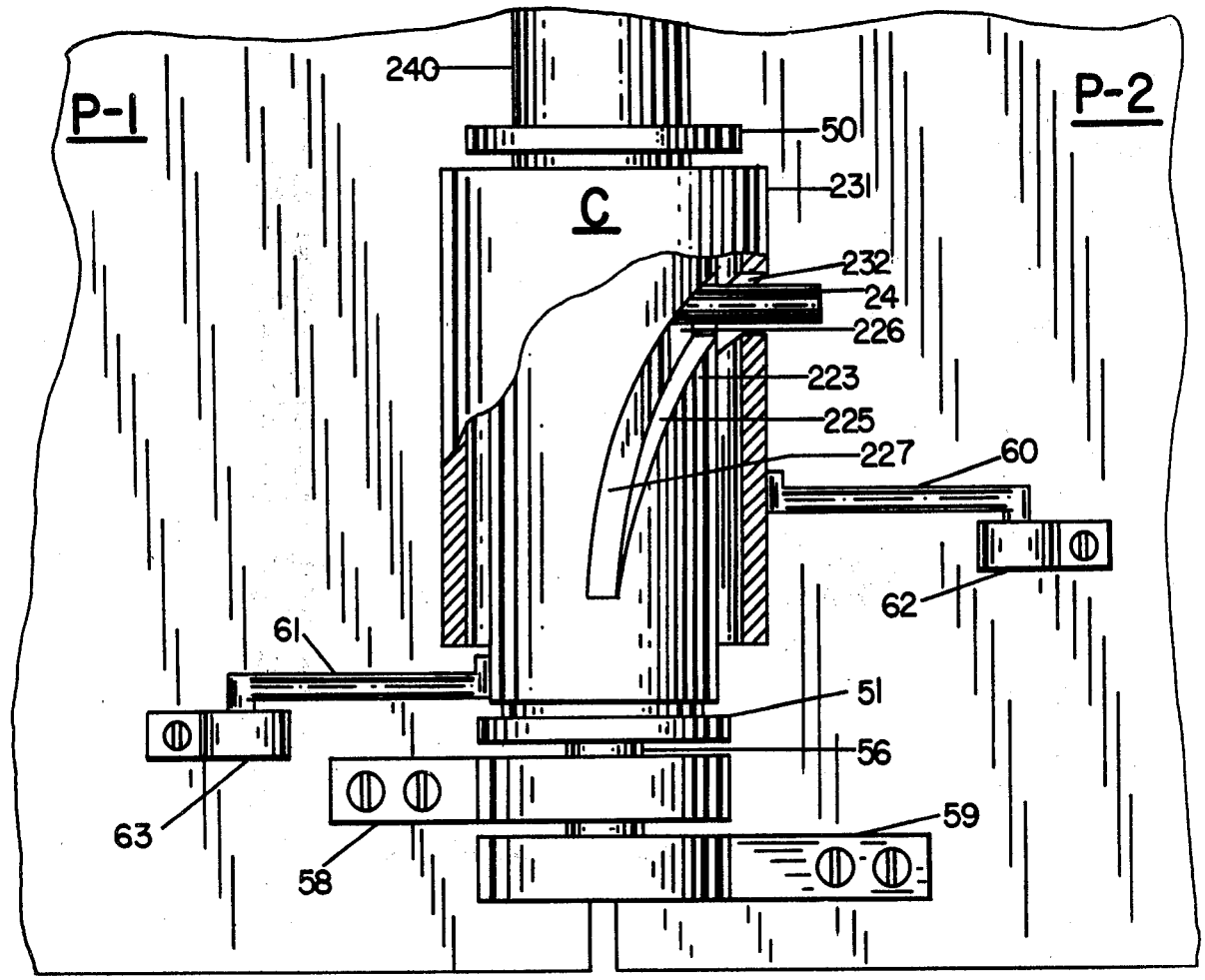
Figure 12:
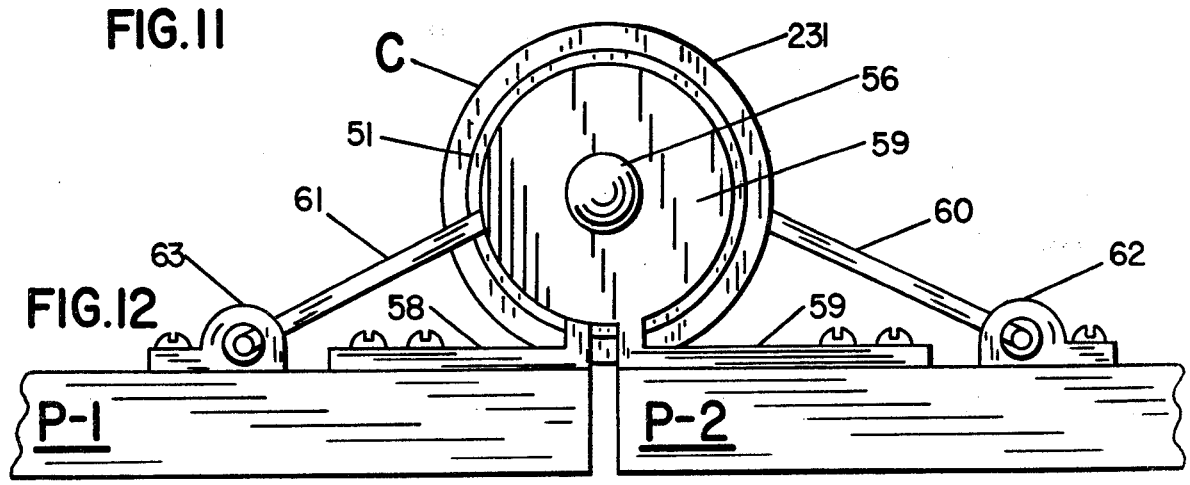
Figure 13:
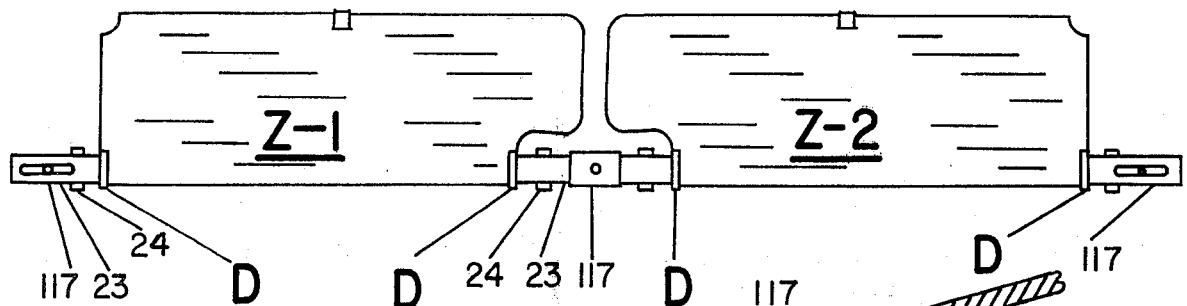
Figure 14:
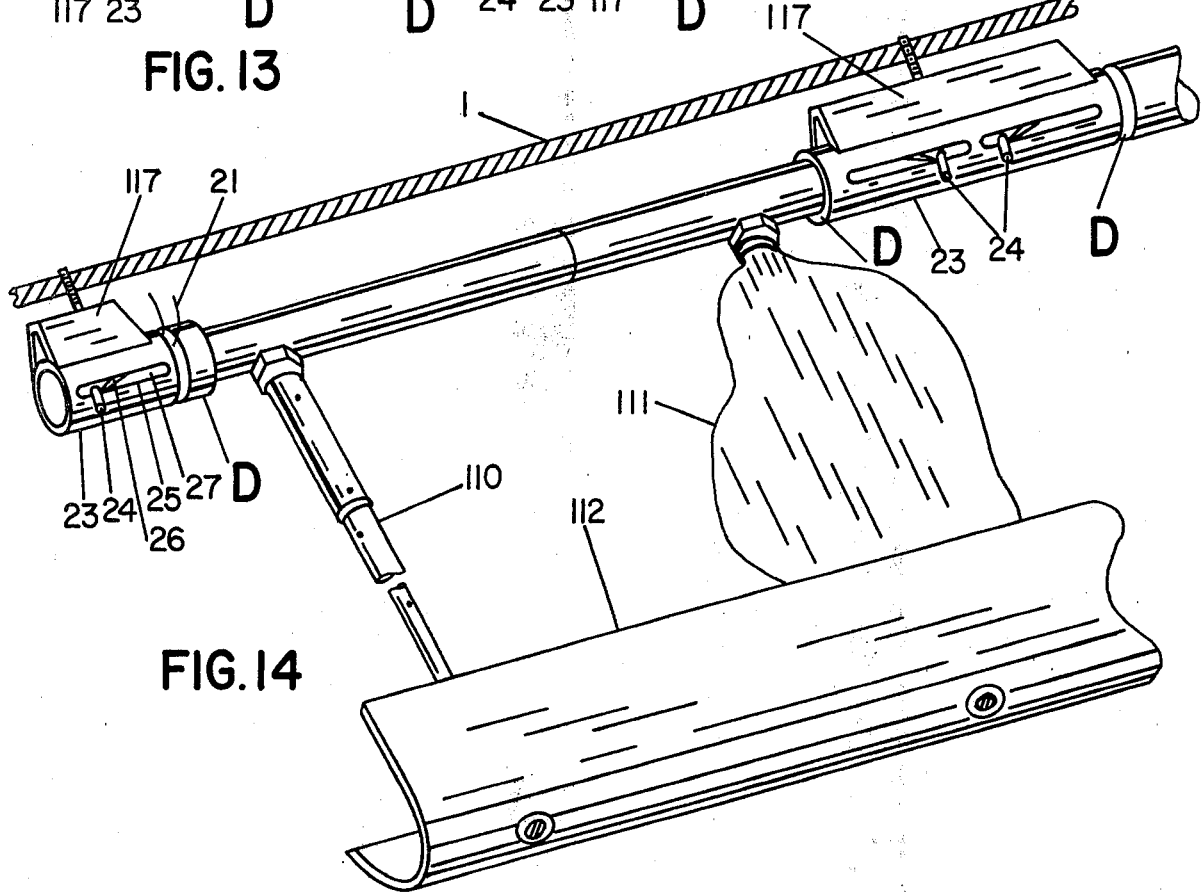
Figure 15:
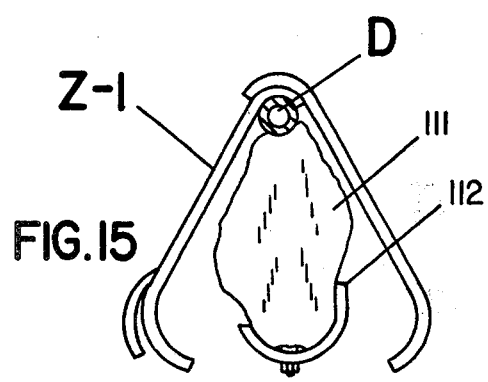
Figure 16:
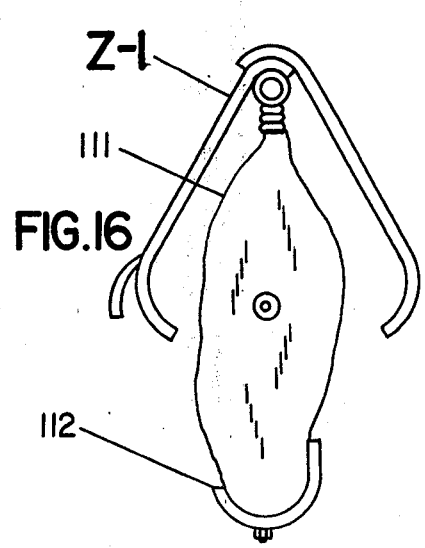
Figure 17:
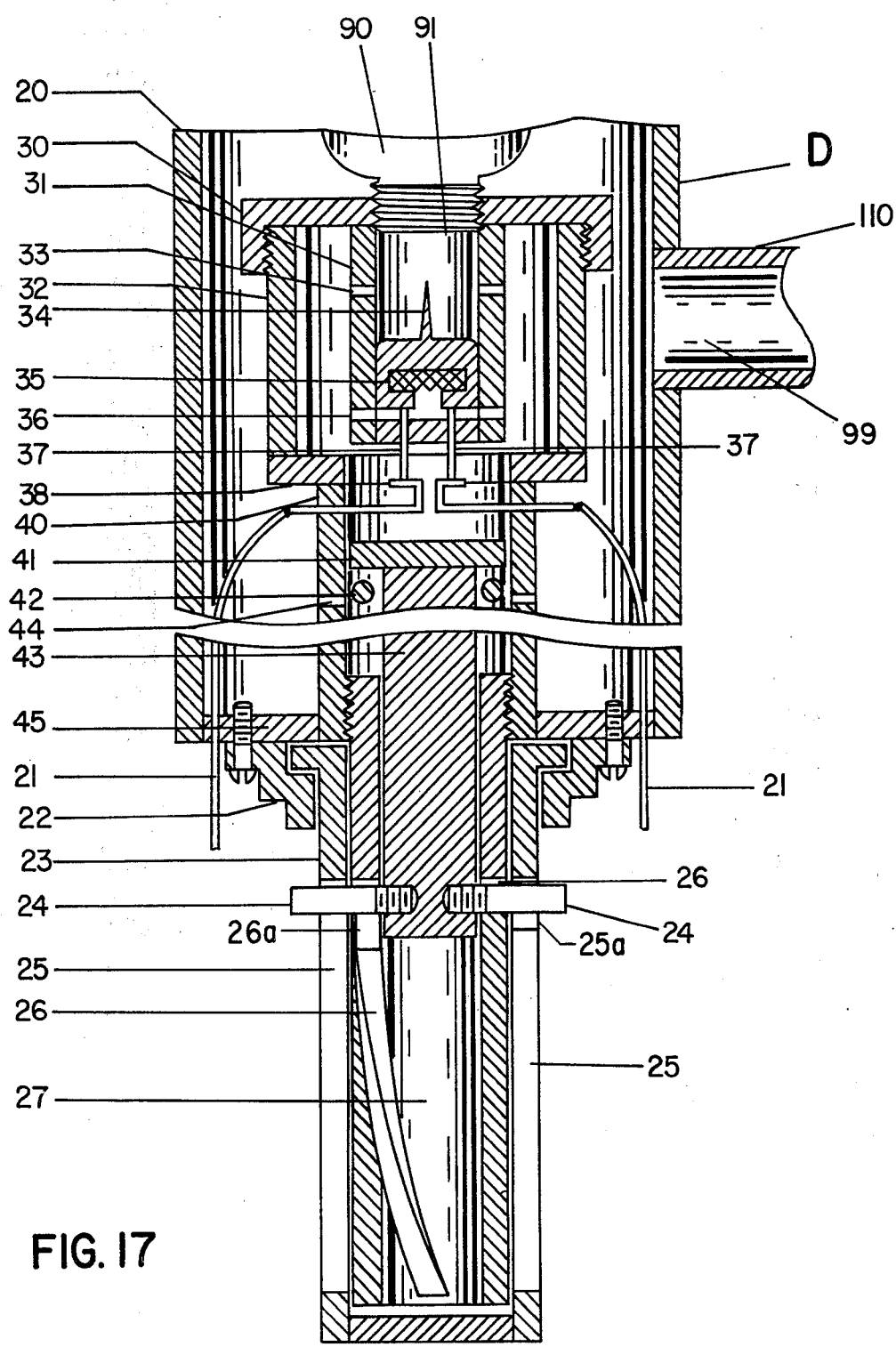

FIG. 11 is a front elevational view of another embodiment of the device shown partially in section with three concentric tubes as mounted along the hinge line of a folding panel with the inner concentric tube having a straight longitudinal slot and being held in a fixed plane and the two outer concentric tubes being rotatable and having spiral slots in opposite directions and attached arms which engage opposite panels;

FIG. 12 is a bottom view of the device as shown in FIG. 11;

FIG. 13 is a top plan view showing two air bag containers mounted on shaft tubes connecting four of the devices in the configuration shown in FIG. 17;

FIG. 14 is a partial perspective view showing three of the devices in the FIG. 17 configuration fixed within sealed shaft tubes having telescoping tube and air bag restraint system attachments rotatably mounted to an overhead structure;

FIG. 15 and FIG. 16 are side elevational views of an air bag container and air bag after rotation to a vertical position by the device shown in FIG. 17 and commencement of inflation; and, FIG. 17 is a partial sectional view of the device in the configuration used in FIGS. 13–16 having apertures in the piston pressure tube which release gas into the surrounding sealed tube.

DESCRIPTION OF THE PREFERRED EMBODIMENT

Four basic configurations of this invention are shown in the drawings and designated devices A, B, C, and D. Devices A and D are closely related and are shown in detail in FIGS. 3 and 17. Devices B and C are closely related and shown in detail in FIGS. 9 and 11.

Figures 2, 3:
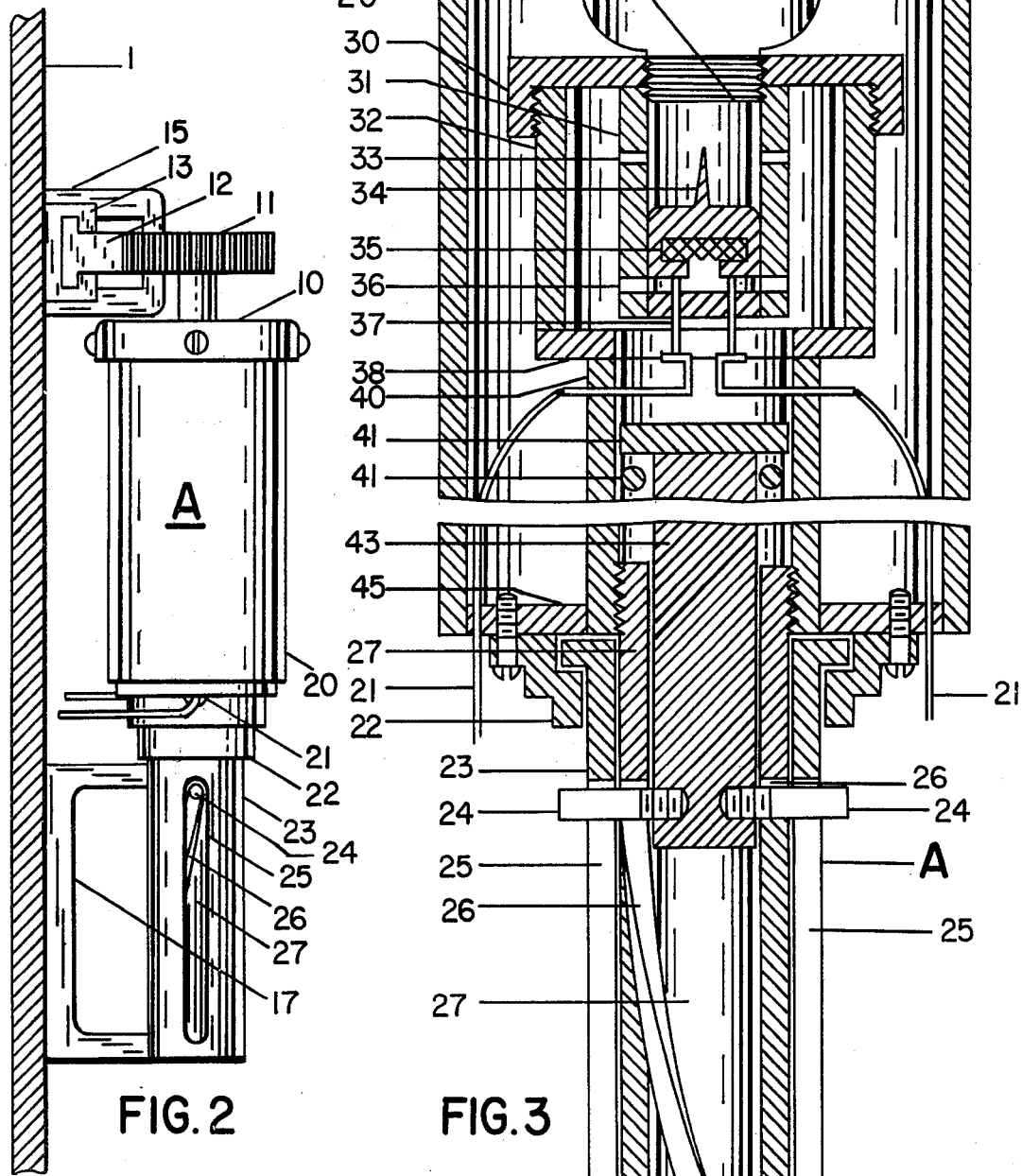
FIG. 2 is a side elevational view of the device taken along line 2—2 of FIG. 1 and showing a straight longitudinal slot in the outer concentric tube of the device and a right to left spiral slot in the inner concentric tube, both of which slots are engaged by a piston shaft lug.
FIG. 3 is a partial sectional view of the device shown in FIGS. 2 and 5.

As shown in FIG. 3, device A includes a hollow shaft 20, which may or may not be sealed, containing a cylinder of compressed gas 90 which is screwed into cap 30 and detonation tube 31 fixed on and into expansion tube 32. Detonation tube 31 contains detonator pin 34 and detonator 35, commercially available, with contacts 37 passing through the end of plug 38. Expansion tube 32 is fixed to piston pressure tube 40 contains flanged piston 41, "O" rings 42 and leads 21 connected to contacts 37. Pressure tube 40 is fixed to hollow shaft end plug 45 and piston shaft tube 27 is screwed or otherwise fastened into the end of pressure tube 40, serving as a stop for flanged piston 41 and supporting piston shaft 43. Piston shaft tube 27 is closely surrounded by outer concentric tube 23 which is rotatably mounted to hollow shaft end plug 45 by retention and bearing ring 22 fastened to end plug 45. Each of the piston shaft lugs 24 passes through a helical slot 26 in the wall of piston shaft tube 27 and a straight longitudinal slot 25 in the wall of outer concentric tube 23 and is screwed or otherwise fastened into the external end of piston shaft 43. Leads 21 pass through the walls of end plug 45 and run to a sensor and trigger switch located elsewhere and not shown.

Device D, as shown in FIG. 17, has the same elements as device A, shown in FIG. 3, with the exception of apertures 44 located in the walls of pressure tube 40 to permit escape of gas from the pressure tube into the surrounding hollow shaft 20 after travel of flanged piston 41 outwardly through pressure tube 40. In addition, hollow shaft 20 must be sealed by end plug 45 and at the opposite end.

Device B and C configurations, as shown in FIGS. 9 and 11, contain all of the internal parts common to either devices A or D, but include external concentric tubes in which the inmost concentric tube, piston shaft tube 127 in device B, as shown in FIG. 9, and tube 227 in device C, as shown in FIG. 11, has a straight longitudinal slot 126. Spiral slots are contained in the outer concentric tube 123 of device B, as shown in FIG. 9, and in middle concentric tube 223 and outer concentric tube 231 of device C, as shown in FIG. 11. In both device B and device C lug 24 passes through and engages these diverging slots and is fastened into piston shaft 43 as in devices A and D, shown in FIGS. 3 and 17.

Figure 1:
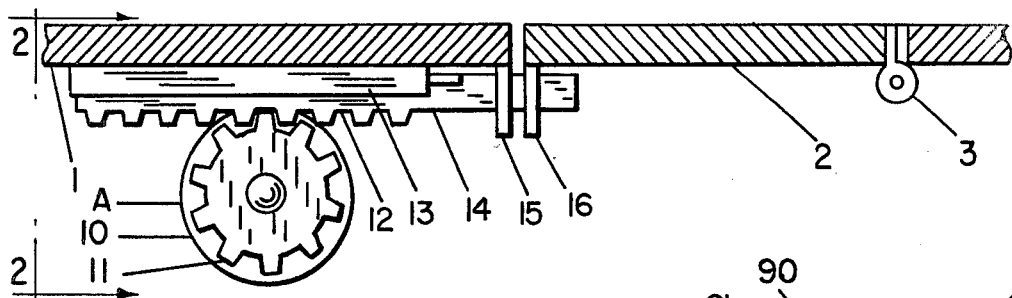
FIG. 1 is an end view of this device and attached gear fixed to an overhead surface with the gear engaging the rack of a sliding latch locking a hinged panel.
Figure 4:
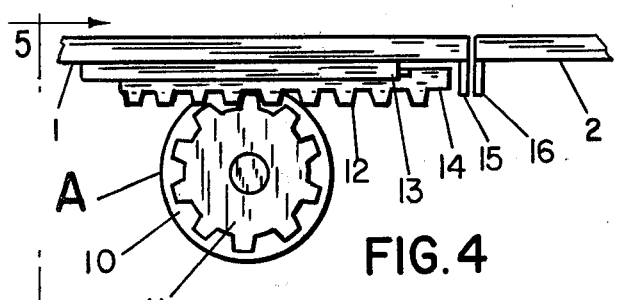
FIG. 4 is an end view of the device and attached gear engaging the rack of a sliding latch prior to movement to a latched position.
Figure 5:
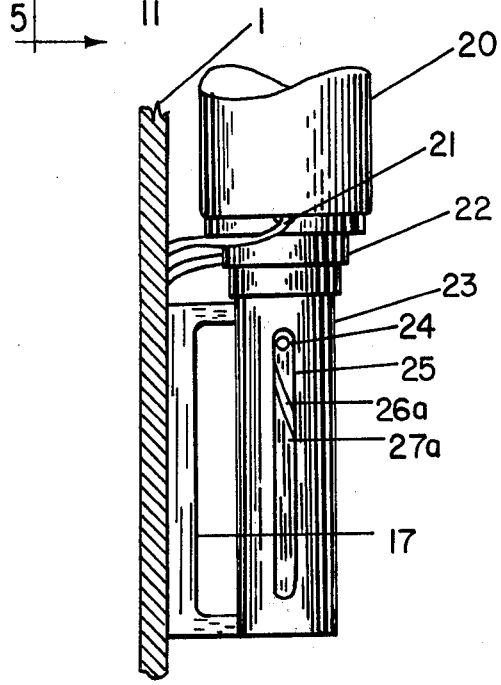
FIG. 5 is a partial elevational view of the device taken along line 5—5 of FIG. 4 and showing a left to right spiral slot in the inner concentric tube.

Referring to FIGS. 1 and 2, rotary actuation device A of this invention is shown mounted on fixed surface 1 and positioned to rotate gear 11 in rack 12 to withdraw latch 14 holding hinged panel 2 in a closed position. FIGS. 4 and 5 show device A similarly mounted and positioned to rotate gear 11 in rack 12 to drive latch 14 into a position locking panel 2.

FIGS. 1 and 2 considered together show that device A is mounted to surface 1 by bracket 17 fixed to longitudinally slotted tube 23. Gear 11 fixed to hollow shaft 20 by shaft cap 10 engages rack 12 slideably mounted in flanged channel 13 attached to surface 1. In FIG. 1, rack latch pin 14 is positioned within staple 15 fixed to surface 1 and staple 16 fixed to panel 2 which is hinged to surface 1 on the opposite edge by hinge 3. FIG. 2 shows piston lug 24 of device A passing through and engaging longitudinal slot 25 in outer tube 23 and spiral slot 26 in tube 27. In FIGS. 4 and 5 all elements of device A are the same as FIGS. 1 and 2, except as hereinafter mentioned and except that rack 12 is positioned at an outward point in channel 13 and rack pin 14 is not engaged with staples 15 and 16, thereby leaving hinged panel 2 in an unlatched position. Piston shaft tube 27a in FIG. 5 has a left to right spiral slot 26a to produce the desired direction of rotation, while examination of FIG. 2 shows a right to left spiral slot 26 in piston shaft tube 27 producing a rotation in the opposite direction.

Figure 6:
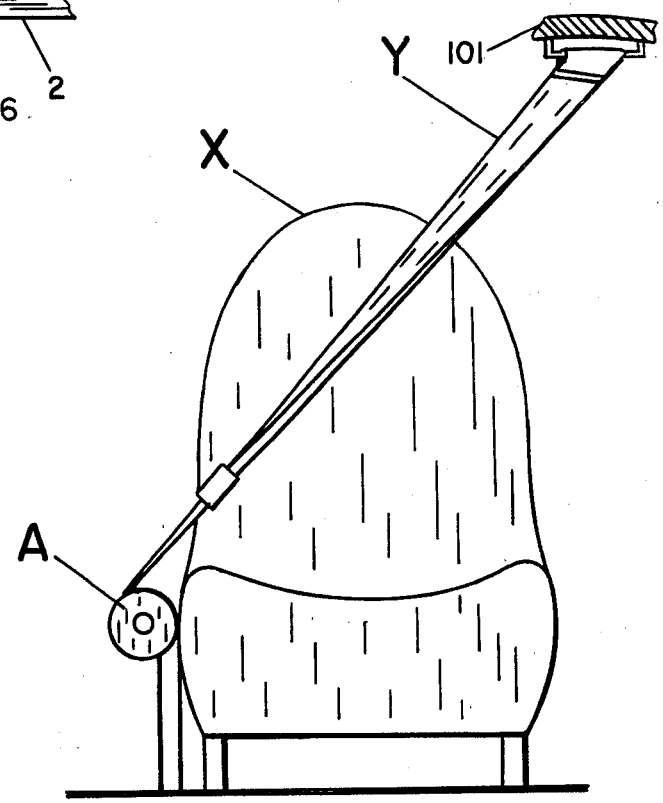
FIG. 6 is a front elevational view of the device mounted at the side of a vehicle seat and engaging a restraint strap fastened to the vehicle structure.
Figure 7:
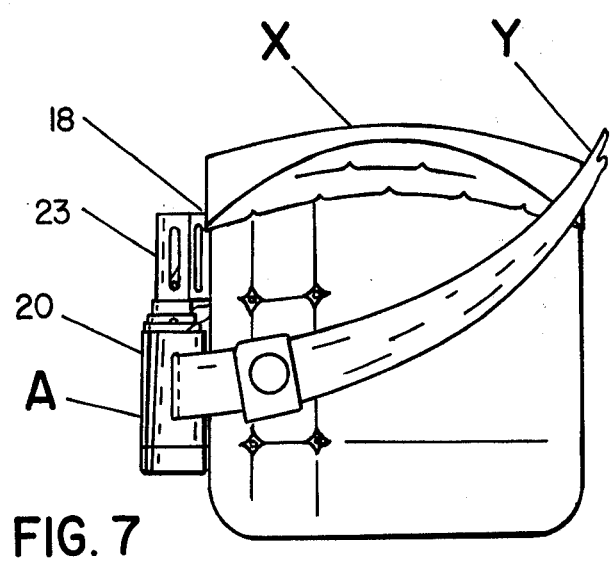
FIG. 7 is a top plan view of the device mounted as shown in FIG. 6 and engaging a restraint strap.

Referring to FIGS. 6 and 7, device A is shown mounted at the side of a vehicle seat X on bracket 18, and restraint chest strap Y is attached to hollow shaft tube 20 of the device and, at the opposite end, to surface 101 overhead. It is obvious that a second strap Y may be attached to device A and to surface 101 on the opposite side of the vehicle and that device A with strap Y attached may be mounted to the surface 101 of the vehicle with the opposite end of strap Y being attached to the seat or other vehicle surface. It is also obvious that each end of strap Y may be attached to separate rotary devices A mounted at different points on surface 101.

Configuration B of the device, as shown in FIGS. 8 and 9, includes essentially the elements of either device A in FIG. 3 or device D in FIG. 17, except that outer concentric tube 123 has a helical slot 125 and inner piston shaft tube 127 has a straight longitudinal slot 126. In this embodiment of the invention, tube 20 is connected to surface 1 and the ends of piston shaft tube 127 and outer concentric tube 123 rotatably engage bearing 28 interconnected with surface 1. Travel of piston shaft lug 24 through the diverging slots rotates outer concentric tube 123 and attached pulley 118; device B thereby operating as a reeling device. An advantage of this configuration is that pressure tube 40 is not rotated around flanged piston 41 and "O" ring 42, shown in FIGS. 3 and 17, thereby permitting closer tolerances between piston 41 and the inner wall of pressure tube 40 and between piston shaft 43 and the inner wall of piston shaft tube 127. In addition, tube 20 does not rotate in device B, thereby greatly reducing the area of rotating surfaces.

Figure 10:
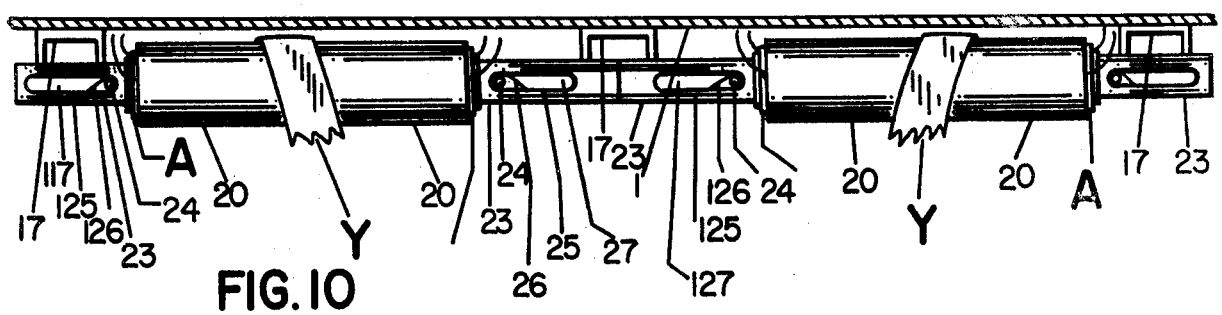
FIG. 10 is a front view of four units of the device as shown in FIGS. 2 and 5 joined by shaft tubes and rotatably mounted to an overhead structure.

FIG. 10 discloses an arrangement of four units in the device A configuration mounted to surface 1 by brackets 17 fixed to outer concentric tubes 23 and with the outer and center devices joined by hollow shafts 20. Center and outer devices on each side apply rotational force to hollow shafts 20 thereby tightening straps Y. It should be recognized that device D, as shown in FIG. 17, may be substituted for device A and used in this arrangement. Such use of device D would permit escape of high pressure gases into hollow shaft 20, thereby reducing the holding pressure on flanged piston 41 in its outward position after shaft lug 24 has been driven through the diverging slots in outer concentric tube 23 and piston shaft tube 27. It should also be recognized that device B may be substituted for device A and used in the assembly and, in such arrangement, inner piston shaft tube 127 is fixed to bracket 17 mounted to surface 1 and outer concentric tube 123 is rotated. In that arrangement, straps Y would be attached to pulley 118 mounted on the outer concentric tube 123 as shown in FIGS. 8 and 9.

Referring to FIGS. 11 and 12, device C configuration of the invention, having three concentric tubes with the two outer tubes rotatable, is mounted on the hinge line of folding panels P-1 and P-2. In device C, pressure tube 240 and piston shaft tube 227 fastened into tube 240 are held in a fixed position. The lower end of shaft tube 227 is fastened to bearing end cap 51 which is fixed to hinge pin 56 above hinge hasps 58 and 59. Bearing end cap 51 fits within and supports the lower end of middle concentric tube 223 and flanged bearing and retention ring 50 fastened around pressure tube 240 provides bearing surfaces for and retains outer concentric tube 231 and middle concentric tube 223. Piston shaft lug 24 engages a straight longitudinal slot in piston shaft tube 227, similar to slot 126 shown in FIG. 9, a right to left spiral slot 225 in middle concentric tube 223 and a left to right spiral slot 232 in outer concentric tube 231. Arm 60 is fixed to the outer wall of outer concentric tube 231 and engages ring 62 fastened to panel P-2 and arm 61 is fixed to middle concentric tube 223 at a point below the end of outer tube 231 and engages ring 63 fastened to panel P-1. When lug 24 is driven through the diverging slots, middle tube 223 is rotated to the right and outer tube 231 is rotated to the left drawing panels P-1 and P-2 to a folded position. It should be noted that device C does not include hollow shaft 20 as in FIGS. 3, 9, and 17, but all other elements of device C are the same as device A as shown in FIG. 3 except as above described and shown in FIGS. 11 and 12.

FIGS. 13 and 14 show assemblies which incorporate device D configuration of the invention at each end of hollow shaft 20. As previously noted, device D has the same elements as device A, except that piston pressure tube 40 has apertures 44 in the wall which release the high pressure gases from cylinder 90 into hollow shaft 20 after piston 41 and "O" ring 42 have been driven to the inner end of shaft tube 27 sealing pressure tube 40 from shaft tube 27. In FIG. 13, air bag containers Z-1 and Z-2 are attached to and are held in a horizontal position by hollow shaft 20. As shown in FIG. 14, device D at the outer and center ends of hollow shaft 20 is fixed to brackets 117 which in turn are connected to surface 1 by bolts. FIG. 13 shows piston shaft lugs 24 in an inward position in each device D unit prior to operation and FIG. 14 shows the lugs after they have been driven outwardly through diverging slots in outer concentric tube 23 and piston shaft tube 27, thereby rotating the air bag container and internal component toward a vertical position, releasing high pressure gases from pressure tube 40 in device D through apertures 44 into hollow shaft 20 and from hollow shaft 20 through apertures 99 into telescoping tube 110 and air bag 111, thereby extending telescoping tube 110 and lap plate 112 and inflating air bag 111. FIGS. 15 and 16 provide side views of air bag container Z-1, air bag 111 and lap plate 112 after completion of rotation by two units of device D and commencement of extension and inflation of air bag 111 and lap plate 112.

In operation of device A, as shown in FIG. 3, an electrical impulse from a switch, triggered by a commercially available impact sensor or manually operated, through lead wires 21 to the explosive charge within pin device 34 causes detonation of explosive 35 which drives pin 34 into the diaphragm 91 of compressed gas cylinder 90, releasing gases at pressures ranging from 800 to 3,000 psi, as selected. Explosive gases from explosive 35 escape from apertures 36 and cylinder gases pass through aperture 33 in detonation tube 31 into expansion tube 32 opening into pressure tube 40, thereby driving flanged piston 41 and "O" ring 42 outwardly through the pressure tube. Upon completion of the stroke flanged piston 41 and "O" ring 42 press against the inner end of piston shaft tube 27 fitted into the end of pressure tube 40 and seal pressure tube 40 from shaft tube 27. The trapped high pressure gases hold piston 41 in an outward position. The internal elements of device B and C configurations operate in the same manner.

In device A, as shown in FIG. 3, the stroke of flanged piston 41 and shaft 43 drives shaft lug 24 through spiral slot 26 in piston shaft tube 27 and straight longitudinal slot 25 in outer concentric tube 23. When outer concentric tube 23 is fixed to surface 1, or 101 as shown in FIGS. 1, 2, 4–7, and 10, the travel of piston shaft lug 24 through diverging slots 25 and 26 rotates piston shaft tube 27 and along with it pressure tube 40 and hollow shaft 20 with attachments. In FIGS. 1, 2, 4, and 5, rotation of hollow shaft 20 and attached gear 11 in rack 12 moves latch pin 14 from a locked to an unlocked position by the use of a right to left spiral slot 26 in piston shaft tube 27 and from an unlocked to a locked position by the use of a left to right spiral slot 26a in piston shaft tube 27a.

Activation of device A, as shown in FIGS. 6, 7, and 10 causes rotation of hollow shaft 20 and serves to tighten strap Y attached to shaft 20. Where a greater tightening force is required, strap Y may be attached to a device A at both ends of strap Y or two units of device A may be inserted and fastened into each end of a single hollow shaft 20, as shown in FIG. 10, with one device A unit having a right to left spiral slot 26 in piston shaft tube 27 and the other having a left to right spiral slot 26a in piston shaft tube 27a. It is readily apparent that additional power can also be attached when needed by joining units in parallel.

In device B configuration, shown in FIGS. 8 and 9, and device C configuration, shown in FIG. 11, the inmost concentric tube, piston shaft tubes 127 and 227, respectively, are held in a fixed position and have a straight longitudinal slots 126 and 226, respectively. In operation of device B, when piston shaft lug 24 is driven through the slots 126, lug 24 also moves through spiral slot 125 in outer concentric tube 123, thereby rotating pulley 118. In operation of device C, lug 24 is driven through spiral slots 225 and 232 in the middle and outer concentric tubes 223 and 231, respectively, thereby rotating arms 60 and 61, respectively.

It should be noted that in all configurations of the device of this invention, devices A–D, the application of an external torque to an attachment fixed to a rotatable member causes the edges of the helical slots to apply an angular force to piston shaft lug 24, moving the lug 24 and piston 41 inwardly or outwardly. In those arrangements where longitudinal slot 25 is in the outer concentric tube 23 and the helical slot is in the inmost concentric tube, piston shaft tube 27, angular force by slot 26 against lug 24 also presses the lug against the edges of longitudinal slot 25 in outer concentric tube which brakes the inward or outward movement of lug 24. On the other hand, where the helical slots are contained in the outer concentric tubes, as in device B and device C, the angular force being applied by the slot edges to the outer ends of lug 24 is greater as a result of external torque and the braking effect of the straight longitudinal slot in the inmost concentric tube 127 in FIG. 9 and 227 in FIG. 11 is reduced. Accordingly, when an external rotational force is applied to pulley 118 in FIG. 9 or arms 60 and 61 in FIG. 11, lug 24 and piston 41 would be moved inwardly or outwardly with relative ease. In device C, the manual opening of panels P-1 and P-2 results in outward and downward movement of shaft lug 24 and manual closing results in inward and upward movement of lug 24. In the event that panels P-1 and P-2 have been partially opened by external force, actuation of device C drives piston lug 24 downwardly through the remaining length of the diverging slots, moving panels P-1 and P-2 to the fully opened position and retaining the panels in the open position until pressure on flanged piston 41 has been dissipated by leakage or released by removal of cylinder 90. If desired, minute leakage holes may be made in the walls of piston pressure tube 40 or 240 to provide a timed holding pressure on shaft lug 24. Also, if desired, self-latching and unlatching provisions may be easily added to device C configuration and to device A, B, and D configurations by incorporating a notch 25a engaging lug 24 at the inward end of the diverging slots or by incorporating a short length of non-diverging slots 26a in FIG. 17 at the inward end and attaching a spring latch which engages the external end of lug 24 and prevents movement of lug 24 except by lineal force applied by flanged piston 41 or externally to the protruding end of lug 24.

Configuration D of the device, as shown in FIG. 17, contains the same internal and external elements as device A configuration shown in FIG. 3, except that apertures 44 are incorporated near the outward end of piston pressure tube 40 and hollow shaft 20 must be tightly sealed at both ends, either by use of a unit of device D at each end of hollow shaft 20, as shown in FIGS. 13 and 14, or by use of a closing plug at the end opposite from the end in which device D is inserted. Upon operation of device D, piston shaft lug 24 is driven through diverging slots 25 and 26 in outer concentric tube 23 and piston shaft tube 27, thereby rotating tube 27 and with it hollow shaft 20. Upon completion of piston stroke, the face of the piston 41 is at a point which permits the high pressure gases to escape into hollow shaft 20, passing through aperture 99 into an attached inflatable container 111 or into attached telescoping tube 110, as shown in FIG. 14. It is readily apparent that an inflatable strap may be attached to one or more nozzles inserted into aperture 99 in the walls of hollow shaft 20, with such strap being first tightened by rotation and then inflated upon activation of device D.

Considering FIGS. 13 through 16 together, air bag containers Z-1 and Z-2 with four units of device D are normally held in a horizontal position as shown in FIG. 13. The cantilevered weight of containers Z-1 and Z-2 applies a torque through hollow shaft 20 which rotates piston shaft tube 27 and presses piston shaft lug 24 against one side of longitudinal slot 25 in outer concentric tube 23, normally preventing unwanted downward rotation of the containers. If desired, self-locking features, discussed above, may be incorporated, or one or both edges of slot 25 may be notched along the entire length thereby holding lug 24 in the desired position until an overriding lineal force is applied to lug 24. Such provisions enable the use of the rotatable air bag containers either in a locked horizontal position or as a sun visor during normal operations.

Upon activation of device D by electrical impulse from a sensor or manual switch to detonator pin 34, containers Z-1 and Z-2 attached to hollow shaft 20 are rotated to a vertical position at which point flanged piston 41 is in a position which releases gases into telescoping tube 110 and air bag 111, thereby pressing open container covers 115 and extending and inflating air bag 111 in a position in front of the passenger. It should be noted that when containers Z-1 and Z-2 are being used as sun visors and are positioned in a partially or fully down position, lug 24 may be at an intermediate point along longitudinal slot 25 in outer concentric tube 23 or in a full outward position. In such position, flanged piston 41 is at an outward point within pressure tube 40 and upon activation completes the remaining stroke, if any, such stroke drives lug 24, rotating Z-1 or Z-2 to a vertical or holding Z-1 or Z-2 in the vertical and immediately releasing gases through apertures 44 into hollow shaft 20 and telescoping tube 110 with surrounding air bag 111.

It is readily apparent that the assembly shown in FIGS. 13 and 14 may be varied by providing only one device D in either the outer or center end of hollow shaft tube 20. In such arrangement, an end plug with spindle may be inserted in the end opposite and permitted to rotate freely in a bearing fixed to a bracket mounted to surface 1. If desired, such an end plug without rotational force capability may be provided with leads 21 and a detonation tube and detonator to hold a gas cylinder 90 or cylinder of ignitable chemical material which releases gas immediately into hollow shaft 20 upon activation by electrical impulse. In such a configuration, the process of extension and expansion of telescoping tube 110 and air bag 111 with lap plate 112 would commence at the same time that containers Z-1 and Z-2 are being rotated by force from device D at the opposite end of hollow shaft 20. Upon completion of piston stroke by device D, gases released into hollow shaft 20 from device D complete the inflation of air bags 111.

It should be noted that while the devices shown in the drawings and described above use one type of explosive actuator to rupture the diaphragm 91 of gas cylinder 90, there are other types of such actuators commercially available and gas cylinders with diaphragms ruptured by explosive charges are also commercially available. The use of gas cylinders with diaphragms ruptured by shaped charges or of cylinders of ignitable chemical material would enable gas cylinder 90 or such chemical material cylinder to be fastened into a cap 30 fixed on the inward end of pressure tube 40, thereby eliminating the need for detonation tube 31 and expansion tube 32, as shown in FIGS. 3 and 17. Various other changes and modification to the devices disclosed may be made without departing from the spirit of the invention, therefore, the invention should be defined by the following claims:

I claim:

1. An emergency rotary actuation device, including:
  a. a pressure tube having a sealed chamber secured to one end thereof,
  b. a piston positioned within said pressure tube, said piston having a shaft extending therefrom to the other end of said pressure tube,
  c. a source of gas pressure contained within said chamber,
  d. condition responsive electrically fired explosive means for initiating the substantially complete release of gas pressure from said chamber into said piston tube for longitudinally moving said piston within said pressure tube,
  e. a first concentric tube extending from said other end of said pressure tube, at least a portion of said shaft extending into said first concentric tube, and said first concentric tube having a slot formed in the wall thereof and extending along a substantial portion thereof,
  f. a second concentric tube concentrically mounted with respect to said first concentric tube, said second concentric tube having a slot formed in the wall thereof extending along the portion of the length thereof overlying the slot portion of the length of said first concentric tube,
  g. one of said slots being straight and the other of said slots being helical,
  h. at least one lug carried by said shaft and extending radially outwardly and engaging both of said slots,
  i. means for preventing rotation of one of said tubes,
  j. cylinder housing means concentrically and rotatably mounted about said pressure tube, said sealed chamber, and said condition responsive electrically fired explosive means,
  k. rotation responsive operator means secured to said cylinder housing means, and
  l. whereby upon actuation of said electrically fired explosive initiating means, said gas pressure forces said piston along said pressure tube and said shaft and said lug and cause relative rotation of said concentric tubes and operation of said operator means.

2. An emergency rotary actuation device as in claim 1 and wherein:
  a. said second concentric tube being held in a fixed position and said first concentric tube being rotatable with respect to said second concentric tube.

3. An emergency rotary actuation device as in claim 1 and wherein:
  a. said helical slot includes a straight portion parallel to said straight slot.

4. An emergency rotary actuation device as in claim 1 and including:
  a. at least one notch formed in at least one edge of said straight slot.

5. An emergency rotary actuation device as in claim 1 and wherein:
  a. said pressure tube includes at least one aperture in the wall thereof near the limit of piston travel for release of gas pressure from said pressure tube after said piston has traveled along said pressure tube.

6. An emergency rotary actuation device as in claim 5 and wherein:
  a. said piston includes an annular flange thereon and said pressure tube includes an annular stop engageable by said flange for limiting the extent of travel of said piston.

7. An emergency rotary actuation device as in claim 1 and wherein:
  a. said pressure tube is secured within said cylinder housing, means
  b. said second concentric tube is secured to a fixed surface, and
  c. said cylinder housing means is rotatable with respect to said fixed surface.

8. An emergency rotary actuation device as in claim 7 and wherein:
  a. said cylinder housing means is sealed.

9. An emergency rotary actuation device as in claim 7 and wherein:
  a. said rotation responsive operator means is attached to said cylinder housing means, and
  b. said cylinder housing means is secured to said first concentric tube.

10. An emergency rotary actuation device comprising:
  a. a pressure tube having a sealed chamber secured to one end thereof,
  b. a piston positioned within said pressure tube, said piston having a shaft extending therefrom through the other end of said pressure tube,
  c. a source of gas pressure contained within said chamber,
  d. condition responsive electrically fired explosive means for initiating the substantially complete release of gas pressure from said chamber into said pressure tube for longitudinally moving said piston within said pressure tube,
  e. a first concentric tube secured to and extending from said other end of said pressure tube, at least a portion of said shaft extending into said first concentric tube, and said first concentric tube having a slot formed in the wall thereof and extending along a substantial portion thereof,
  f. a second concentric tube rotatably concentrically mounted with respect to said first concentric tube, said second concentric tube having a slot formed in the wall thereof extending along the portion of the length thereof overlying the slotted portion of the length of said first concentric tube,
  g. at least one lug carried by said shaft and extending radially outwardly and engaging both of said slots,
  h. a third concentric tube rotatably concentrically mounted with respect to said first and said second tubes, said third tube having a slot formed in the wall thereof extending along the portion of the length thereof overlying the slotted portions of the length of said first and second concentric tubes,
  i. two of said slots being helical and said lug engaging the slot in each of said tubes,
  j. first rotation responsive operator means connected to one of said tubes,
  k. second rotation responsive operator means connected to another of said tubes, and
  l. whereby upon actuation of said electrically fired explosive opening initiating means, said gas pressure forces said piston along said pressure tube and said shaft and said lug cause relative rotation of said concentric tubes and operation of said first and second operator means.

11. An emergency rotary actuation device as in claim 10 and wherein:
  a. said helical slots are oppositely directed.

12. An emergency rotary actuation device as in claim 1 or 10 and wherein:
  a. said source of gas pressure includes a rupturable sealing element,
  b. said electrically fired explosive means includes a detonation tube secured around said sealing element at one end thereof,
  c. an expansion chamber surrounding said detonation tube and in communication with said piston tube,
  d. at least one aperture in said detonation tube for communication with said expansion tube,
  e. a detonator pin within said detonation tube,
  f. a detonator associated with said detonator pin,
  g. lead wires from said detonator to an exteriorly positioned, impact responsive switch, and
  h. whereby an electrical impulse from said switch causes the explosion of said detonator forcing said detonator pin along said detonation tube and through said sealing element thereby releasing gas from said source of gas pressure.

13. An emergency rotary actuation device, comprising:
  a. a pressure tube having a sealed chamber secured to one end thereof;
  b. a piston positioned within said pressure tube, said piston having a shaft extending therefrom to the other end of said pressure tube;
  c. a source of gas pressure contained within said chamber;
  d. condition responsive electrically fired explosive means for initiating the substantially complete release of gas pressure from said chamber into said pressure tube for longitudinally moving said piston within said pressure tube;
  e. a first concentric tube extending from said other end of said pressure tube, at least a portion of said shaft extending into said first concentric tube, and said first concentric tube having a slot formed in the wall thereof and extending along a substantial portion thereof;
  f. a second concentric tube concentrically mounted with respect to said first concentric tube, said second concentric tube having a slot formed in the wall thereof extending along the portion of the length thereof overlying the slotted portion of the length of said first concentric tube;
  g. said second concentric tube slot being generally helical and said first concentric tube slot being generally straight;
  h. at least one lug carried by said shaft and extending radially outwardly and engaging both of said slots;
  i. said second concentric tube adapted for rotation relative to said first concentric tube;
  j. said second concentric tube having an end opposed from said pressure tube;
  k. cylinder housing means concentrically mounted about said pressure tube, said sealed chamber, and said conditioned responsive electrically fired explosive means;
  l. bracket means connected to said cylinder housing means and to generally said end of said second concentric tube for mounting said rotary actuation device on a surface, said bracket being adapted to permit rotation of said second concentric tube;
  m. rotation responsive operator means secured generally to said end of said second concentric tube; and,
  n. whereby upon actuation of said electrically fired explosive initiating means, said gas pressure forces said piston along said pressure tube and said shaft and said lug cause relative rotation of said concentric tubes and operation of said opertor means.

14. An emergency rotary actuation device, including:
  a. a pressure tube having a sealed chamber secured to one end thereof;
  b. a piston positioned within said pressure tube, said piston having a shaft extending therefrom to the other end of said pressure tube;
  c. a source of gas pressure contained within said chamber;
  d. condition responsive electrically fired explosive means for initiating the substantially complete release of gas pressure from said chamber into said piston tube for longitudinally moving said piston within said pressure tube;
  e. a first concentric tube extending from said other end of said pressure tube, at least a portion of said shaft extending into said first concentric tube, and said first concentric tube having a slot formed in the wall thereof and extending along a substantial portion thereof;

f. a second concentric tube concentrically mounted with respect to said first concentric tube, said second concentric tube having a slot formed in the wall thereof extending along a portion of the length thereof overlying the slot portion of the length of said first concentric tube;

g. one of said slots being straight and the other of said slots being helical;

h. at least one lug carried by said shaft and extending radially outwardly and engaging both of said slots;

i. means for preventing rotation of one of said tubes;

j. cylinder housing means concentrically and rotatably mounted about said pressure tube, said sealed chamber, and said condition responsive electrically fired explosive means;

k. said cylinder housing means including rotation responsive operator means;

l. said pressure tube including at least one aperture in the wall thereof near the limit of piston travel for release of gas pressure from said pressure tube after said piston has traveled along said pressure tube;

m. said cylinder housing being sealed;

n. said aperture in said pressure tube communicating with the interior of said cylinder housing;

o. said housing including at least one aperture for release of pressurized gas;

p. a flexible container attached to said cylinder housing means and sealed around said aperture and said cylinder housing for receiving released gas; and, q. whereby upon actuation of said electrically fired explosive initiating means, said gas pressure forces said piston along said pressure tube and said shaft and said lug and cause relative rotation of said concentric tubes in operation of said operator means.

15. Emergency rotary actuation device, including:

a. a pressure tube having a sealed chamber secured to one end thereof;

b. a piston positioned within said pressure tube, said piston having a shaft extending therefrom to the other end of said pressure tubes;

c. a source of gas pressure contained within said chamber;

d. condition response of electrically fired explosive means for initiating the substantially complete release of gas pressure from said chamber into said pressure tube for longitudinally moving said piston within said pressure tube;

e. a first concentric tube extending from said other end of said pressure tube, at least a portion of said shaft extending into said first concentric tube, and said first concentric tube having a slot formed in the wall thereof and extending along a substantial portion thereof;

f. a second concentric tube concentrically mounted with respect to said first concentric tube, said concentric tube having a slot formed in the wall thereof extending along the portion of the length thereof overlying the slot portion of the length of said first concentric tube;

g. one of said slots being straight and the other of said slots being helical;

h. at least one lug carried by said shaft and extending radially outwardly and engaging both of said slots;

i. means for preventing rotation of one of said tubes;

j. cylinder housing means concentrically and rotatably mounted about said pressure tube, said sealed chamber, and said condition responsive electrically fired explosive means;

k. said cylinder housing means including rotation responsive operator means;

said pressure tube including at least one aperture in the wall thereof near the limit of piston travel for release of gas pressure from said pressure tube after said piston has traveled along said pressure tube;

m. said cylinder housing means is sealed;

n. said aperture in said pressure tube communicating with the interior of said cylinder housing means;

o. said cylinder housing means including at least one aperture for release of pressurized gas;

p. a telescopic tube attached to said cylinder housing means and sealed around said aperture and said cylinder housing means for receiving release gas; and, q. whereby upon actuation of said electrically fired explosive initiating means, said gas pressure forces said piston along said pressure tube and said shaft and said lug and cause relative rotation of said concentric tubes in operation of said operator means.

16. An emergency rotary actuation device as in claim 15 and including:

a. a substantially rigid member attached to said distal end of said telescopic tube.

* * * * *